(12) United States Patent
Watanabe et al.

(10) Patent No.: US 9,977,624 B2
(45) Date of Patent: May 22, 2018

(54) STORAGE CONTROL APPARATUS AND STORAGE CONTROL METHOD

(71) Applicant: FUJITSU LIMITED, Kawasaki-shi, Kanagawa (JP)

(72) Inventors: Takeshi Watanabe, Kawasaki (JP); Kazuhiko Ikeuchi, Kawasaki (JP); Chikashi Maeda, Kawasaki (JP); Kazuhiro Urata, Kawasaki (JP); Yukari Tsuchiyama, Kawasaki (JP); Guangyu Zhou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 15/047,686

(22) Filed: Feb. 19, 2016

(65) Prior Publication Data
US 2016/0291901 A1 Oct. 6, 2016

(30) Foreign Application Priority Data
Mar. 31, 2015 (JP) .................................. 2015-071244

(51) Int. Cl.
G06F 12/00 (2006.01)
G06F 3/06 (2006.01)

(52) U.S. Cl.
CPC .......... *G06F 3/0659* (2013.01); *G06F 3/0613* (2013.01); *G06F 3/0689* (2013.01)

(58) Field of Classification Search
None
See application file for complete search history.

(56) References Cited

U.S. PATENT DOCUMENTS

2007/0220208 A1 9/2007 Nomura et al.

FOREIGN PATENT DOCUMENTS

| JP | 2003-345519 | 12/2003 |
|---|---|---|
| JP | 2007-249457 | 9/2007 |
| JP | 2008-310741 | 12/2008 |

*Primary Examiner* — John A Lane
(74) *Attorney, Agent, or Firm* — Fujitsu Patent Center

(57) ABSTRACT

In a storage control apparatus, a control unit determines whether prefetching data on a first data amount basis from a plurality of storage devices to a storage unit causes an imbalance in the numbers of commands issued to the storage devices. When determining that the prefetching causes the imbalance, the control unit prefetches the data on a second data amount basis such as to balance the numbers of commands issued to the storage devices. With this approach, the storage control apparatus creates a different imbalance of the number of read commands issued for each execution of prefetch staging, so as to prevent a fixed imbalance in which more read commands are always issued to a specific storage device.

3 Claims, 13 Drawing Sheets

300 SEQUENTIALITY DETECTION TABLE

| VOLUME NO. | START LBA | END LBA | SEQUENTIALITY DETECTION COUNT | TIMESTAMP |
|---|---|---|---|---|
| #V1 | #H1 | #T1 | #S1 | #TS1 |
| #V2 | #H2 | #T2 | #S2 | #TS2 |
| ... | ... | ... | ... | ... |

FIG. 7

STORAGE CONTROL APPARATUS AND STORAGE CONTROL METHOD

CROSS-REFERENCE TO RELATED APPLICATION

This application is based upon and claims the benefit of priority of the prior Japanese Patent Application No. 2015-071244, filed on Mar. 31, 2015, the entire contents of which are incorporated herein by reference.

FIELD

The embodiments discussed herein relate to a storage control apparatus and a storage control method.

BACKGROUND

Prefetch staging is known as a technique for reducing the time to process read requests received from a host. When sequentiality is detected in read requests on a per-volume basis, the prefetch staging is performed to stage data into a cache memory in advance without waiting for a read request. For the prefetch staging, there are proposed control techniques for increasing a cache hit rate.

In addition, Redundant Arrays of Independent Disks (RAID) is known as a technique for protecting data against disk failures. In RAID, data is distributed across a plurality of disks to improve data protection and data access performance. In addition, RAID 5 and RAID 6 are each known as a RAID level that is a stripe set with distributed parity.

Please see, for example, Japanese Laid-open Patent Publication Nos. 2003-345519, 2007-249457, and 2008-310741.

In fixed-length prefetch staging, a storage control apparatus issues read commands for each disk. In the case of RAID 5 and RAID 6, data in each disk is divided into data blocks by parity. Therefore, the storage control apparatus may issue read commands for each of the data blocks.

In such prefetch staging, for example, a read command is issued "N" times to a disk forming a RAID group, and a read command is issued "N+1" times to another disk forming the RAID group. This imbalance in the numbers of read commands issued increases each time the prefetch staging is performed, which reduces the responsiveness of a specific disk.

A reduction in the responsiveness of a specific disk leads to degradation in the performance of the prefetch staging and thus lowers the throughput in sequential read.

SUMMARY

According to one aspect, there is provided a storage control apparatus for controlling a plurality of storage devices over which data blocks and parity blocks corresponding to the data blocks are distributed. The storage control apparatus includes: a memory; and a processor that performs a procedure including prefetching, when prefetching data on a first data amount basis from the plurality of storage devices to the memory causes an imbalance in numbers of commands issued to the plurality of storage devices, the data on a second data amount basis such as to balance the numbers of commands issued to the plurality of storage devices.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a sequentiality detection table according to the second embodiment;

DESCRIPTION OF EMBODIMENTS

Figure 1:
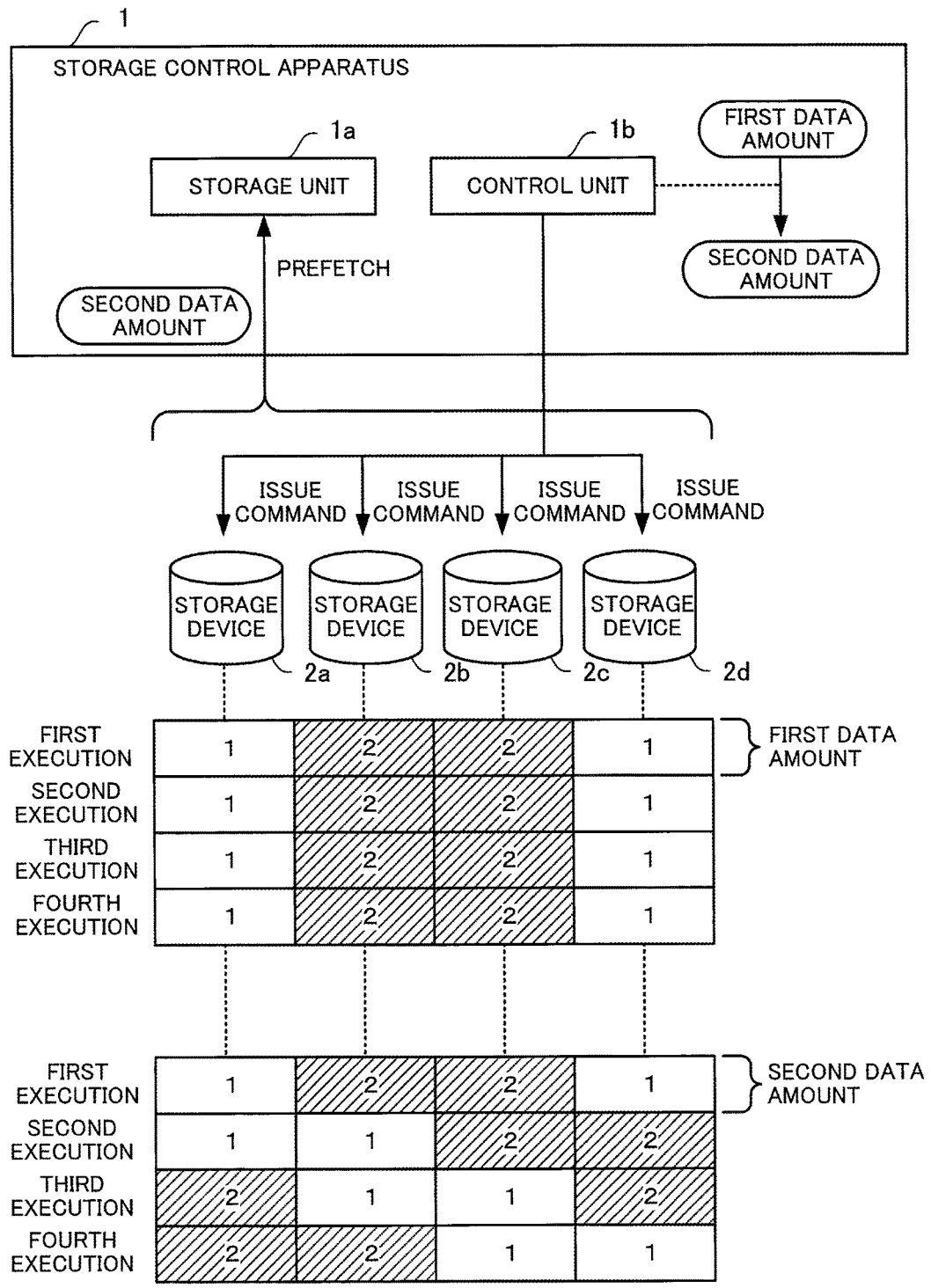
FIG. 1 illustrates an exemplary configuration of a storage control apparatus according to a first embodiment.

Several embodiments will be described below with reference to the accompanying drawings, wherein like reference numerals refer to like elements throughout.

First Embodiment

A storage control apparatus of a first embodiment will now be described with reference to FIG. 1. FIG. 1 illustrates an exemplary configuration of a storage control apparatus according to the first embodiment.

A storage control apparatus 1 controls a plurality of storage devices 2a, 2b, 2c, and 2d. For example, the storage devices 2a, 2b, 2c, and 2d are Solid State Drives (SSDs), Hard Disk Drives (HDDs), or others, or may be Drive Enclosures (DEs) each housing a plurality of SSDs and HDDs.

Over the storage devices 2a, 2b, 2c, and 2d, data blocks and parity blocks corresponding to the data blocks are distributed. For example, the storage devices 2a, 2b, 2c, and 2d are disks that form a RAID 5 or RAID 6 array.

The storage control apparatus 1 includes a storage unit 1a and a control unit 1b. The storage unit 1a stores therein data prefetched from the storage devices 2a, 2b, 2c, and 2d (prefetch staging). The storage unit 1a is a cache memory, for example.

The control unit 1b determines whether prefetching data on a first data amount basis from the storage devices 2a, 2b, 2c, and 2d to the storage unit 1a causes an imbalance in the numbers of commands issued to the storage devices 2a, 2b, 2c, and 2d. The first data amount corresponds to a prescribed range of prefetch staging. In this connection, the control unit 1b does not always need to assume a specific amount as the first data amount. In the case of prefetching data on a prescribed amount (that is, first data amount) basis, the control unit 1b is able to determine, from the RAID level, a possibility of an imbalance in the numbers of commands issued to the storage devices 2a, 2b, 2c, and 2d. For example, the control unit 1b is able to determine, from a RAID level, whether there occurs an imbalance of the number of commands issued. In the case where the RAID level is RAID 5 or RAID 6, the control unit 1b determines that an imbalance of the number of commands issued occurs.

When determining that an imbalance of the number of commands issued occurs, the control unit 1b prefetches data on a second data amount basis such as to balance the numbers of commands issued to the storage devices 2a, 2b, 2c, and 2d.

The following describes an imbalance of the number of read commands issued, which is caused each time data is prefetched. For example, assume that data is prefetched on a first data amount basis. In this case, a command (read command) is issued "once" to each of the storage devices 2a and 2d in the first execution of the prefetching, whereas a command is issued "twice" to each of the storage devices 2b and 2c. Then, the same number of commands as in the first execution of the prefetching are issued in the second and subsequent executions of the prefetching.

If the numbers of commands issued to the individual storage devices 2a, 2b, 2c, and 2d are fixed in prefetching data on a first data amount basis, as described above, an imbalance in the numbers of commands issued to the storage devices increases each time data is prefetched. For example, when the prefetching is performed four times, a total of "four" commands are issued to each of the storage devices 2a and 2d and a total of "eight" commands are issued to each of the storage devices 2b and 2c. Therefore, the storage devices 2b and 2c may reduce their responsiveness and thereby cause degradation in the performance of the prefetch staging.

The following describes how to resolve an imbalance of the number of read commands issued, which is caused each time data is prefetched. For example, assume that data is prefetched on a second data amount basis. In this case, in the first execution of the prefetching, a command is issued "once" to each of the storage devices 2a and 2d, whereas a command is issued "twice" to each of the storage devices 2b and 2c. Subsequently, in the second execution of the prefetching, a command is issued "once" to each of the storage devices 2a and 2b, whereas a command is issued "twice" to each of the storage devices 2c and 2d.

Subsequently, in the third execution of the prefetching, a command is issued "once" to each of the storage devices 2b and 2c, whereas a command is issued "twice" to each of the storage devices 2a and 2d. Subsequently, in the fourth execution of the prefetching, a command is issued "once" to each of the storage devices 2c and 2d, whereas a command is issued "twice" to each of the storage devices 2a and 2b.

Therefore, in the case where data is prefetched on a second data amount basis, a total of "six" commands are issued to each of the storage devices 2a, 2b, 2c, and 2d. Thus, there is no storage device that reduces its responsiveness and thereby degrades the performance of the prefetch staging. That is to say, adopting the second data amount sequentially changes a storage device to which more commands are issued, for each execution of the data prefetching.

As described above, the storage control apparatus 1 creates a different imbalance of the number of read commands issued for each execution of prefetch staging, thereby preventing a fixed imbalance in which more read commands are always issued to a specific storage device. As a result, the storage control apparatus 1 is able to prevent degradation in the performance of prefetch staging due to a reduction in the responsiveness of a specific storage device. That is to say, the storage control apparatus 1 is able to improve throughput for sequential read.

Second Embodiment

Figure 2:
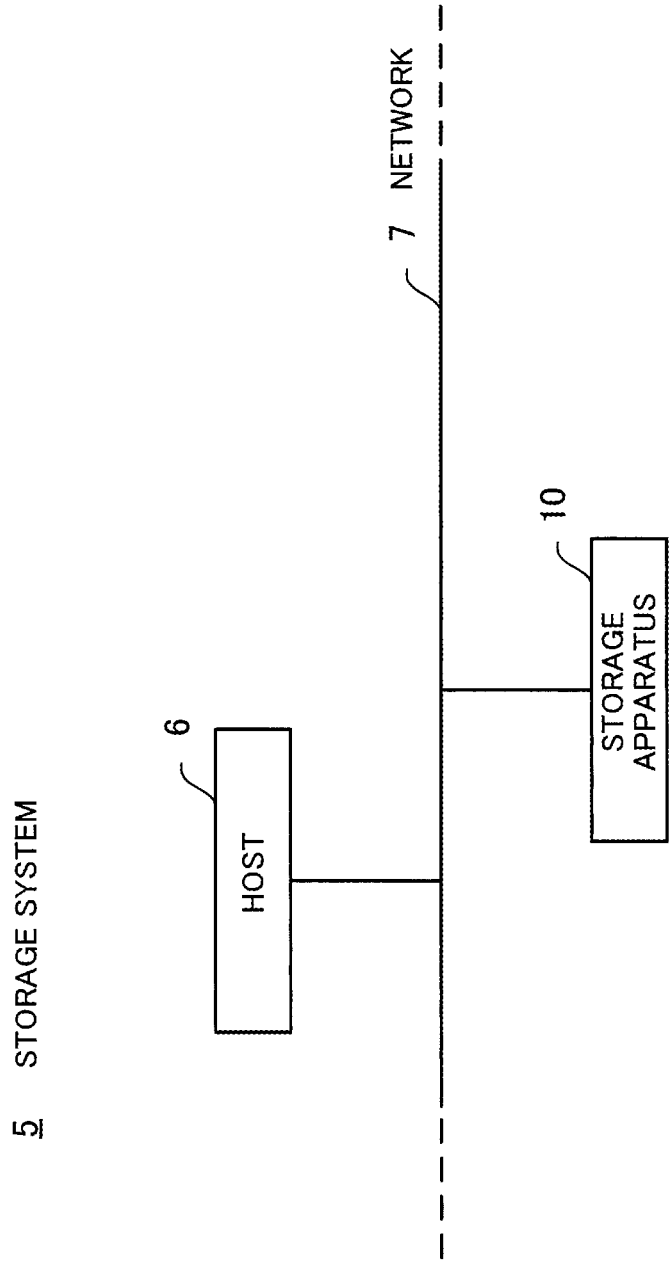
FIG. 2 illustrates an exemplary configuration of a storage system according to a second embodiment.

The following describes a storage system of a second embodiment with reference to FIG. 2. FIG. 2 illustrates an exemplary configuration of a storage system according to the second embodiment.

A storage system 5 includes a host 6, a network (transmission path) 7, and a storage apparatus 10. For example, the network 7 connects one or more storage apparatuses 10 and one or more hosts 6. The storage apparatus 10 is able to communicate with the host 6 over the network 7. The host 6 is able to issue write requests for data write to the storage apparatus and read requests for data read from the storage apparatus 10.

Figure 3:
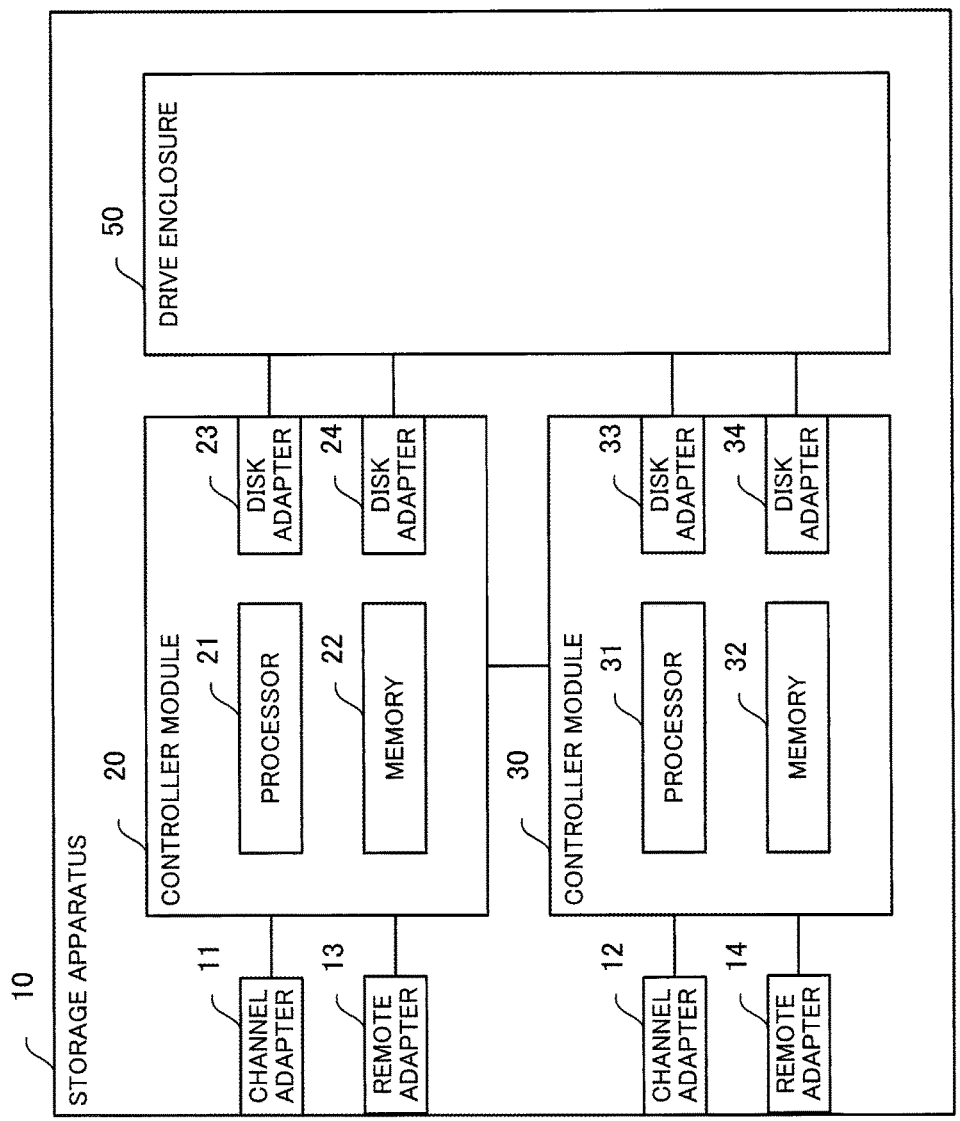
FIG. 3 illustrates an exemplary configuration of a storage apparatus according to the second embodiment.

The following describes a storage apparatus of the second embodiment with reference to FIG. 3. FIG. 3 illustrates an exemplary configuration of a storage apparatus according to the second embodiment.

The storage apparatus 10 includes channel adapters 11 and 12, remote adapters 13 and 14, controller modules (CM) 20 and 30, and a drive enclosure (DE) 50.

The storage apparatus 10 connects with the host 6 via the channel adapters 11 and 12. The channel adapter 11 is provided so as to correspond to the controller module 20, and the channel adapter 12 is provided so as to correspond to the controller module 30. The storage apparatus 10 is able to connect with other storage apparatuses via the remote adapters 13 and 14. The remote adapter 13 is provided so as to correspond to the controller module 20, and the remote adapter 14 is provided so as to correspond to the controller module 30.

The drive enclosure 50 houses a plurality of HDDs. In this connection, the drive enclosure 50 may house SSDs or other storage devices, in place of or together with the HDDs.

Connected to each other, the controller modules 20 and 30 are able to share a load. In this connection, although the storage apparatus 10 includes two controller modules 20 and 30, the storage apparatus 10 is not limited to this and may include either one of the controller modules 20 and 30. Further, the storage apparatus 10 may include three or more controller modules, for example, four or eight controller modules.

The controller module 20 includes a processor 21, a memory 22, and disk adapters 23 and 24. The controller module 30 includes a processor 31, a memory 32, and disk adapters 33 and 34. In this connection, the following describes only the configuration of the controller module 20, and the controller module 30 has the same configuration as the controller module 20.

The processor 21, memory 22, and disk adapters 23 and 24 are interconnected with a bus (not illustrated). The processor 21 entirely controls the controller module 20 to exercise storage control including hierarchical control. In this connection, the processor 21 may be a multiprocessor. The processor 21 may be a Central Processing Unit (CPU), a Micro Processing Unit (MPU), a Digital Signal Processor (DSP), an Application Specific Integrated Circuit (ASIC), or a Programmable Logic Device (PLD). In addition, the processor 21 may be a combination of components selected from a CPU, an MPU, a DSP, an ASIC, and a PLD.

The memory 22 is a buffer for holding data when the data is read from or written to an HDD. In addition, the memory 22 stores user data and control information.

For example, the memory 22 includes a Random Access Memory (RAM) and a non-volatile memory. The RAM is used as a main storage device of the controller module 20. The RAM temporarily stores part of an operating system (OS) program, firmware, and application programs, which are executed by the processor 21. In addition, the RAM stores a variety of data that is used while the processor 21 runs. The RAM includes a cache memory, separately from a memory used for storing the variety of data. In this connection, the cache memory stores data prefetched from the HDDs.

The non-volatile memory retains data even when the storage apparatus 10 is turned off. The non-volatile memory may be a semiconductor storage device, such as an Electrically Erasable and Programmable Read Only Memory (EEPROM) or a flash memory, or an HDD. The non-volatile memory is used as an auxiliary storage device of the controller module 20. The non-volatile memory stores the OS program, firmware, application programs, and a variety of data.

Peripheral devices to be connected to the bus include an input-output interface and a communication interface. The input-output interface is connected to an input-output device for inputs and outputs. The input-output interface gives signals and data received from the HDD or another storage device to the processor 21 or the memory 22. The input-output interface outputs signals received from the processor 21 to another control unit or to an output device connected to the controller module 20. The communication interface communicates data with another controller module (controller module 30) within the storage apparatus 10.

The disk adapters 23 and 24 control an interface with the HDDs (access control).

The above described hardware configuration achieves the processing functions of the storage apparatus 10 or the controller modules 20 and 30. In this connection, the storage control apparatus 1 of the first embodiment may be configured with the same hardware as the storage apparatus 10 or controller modules 20 and 30.

Figure 4:
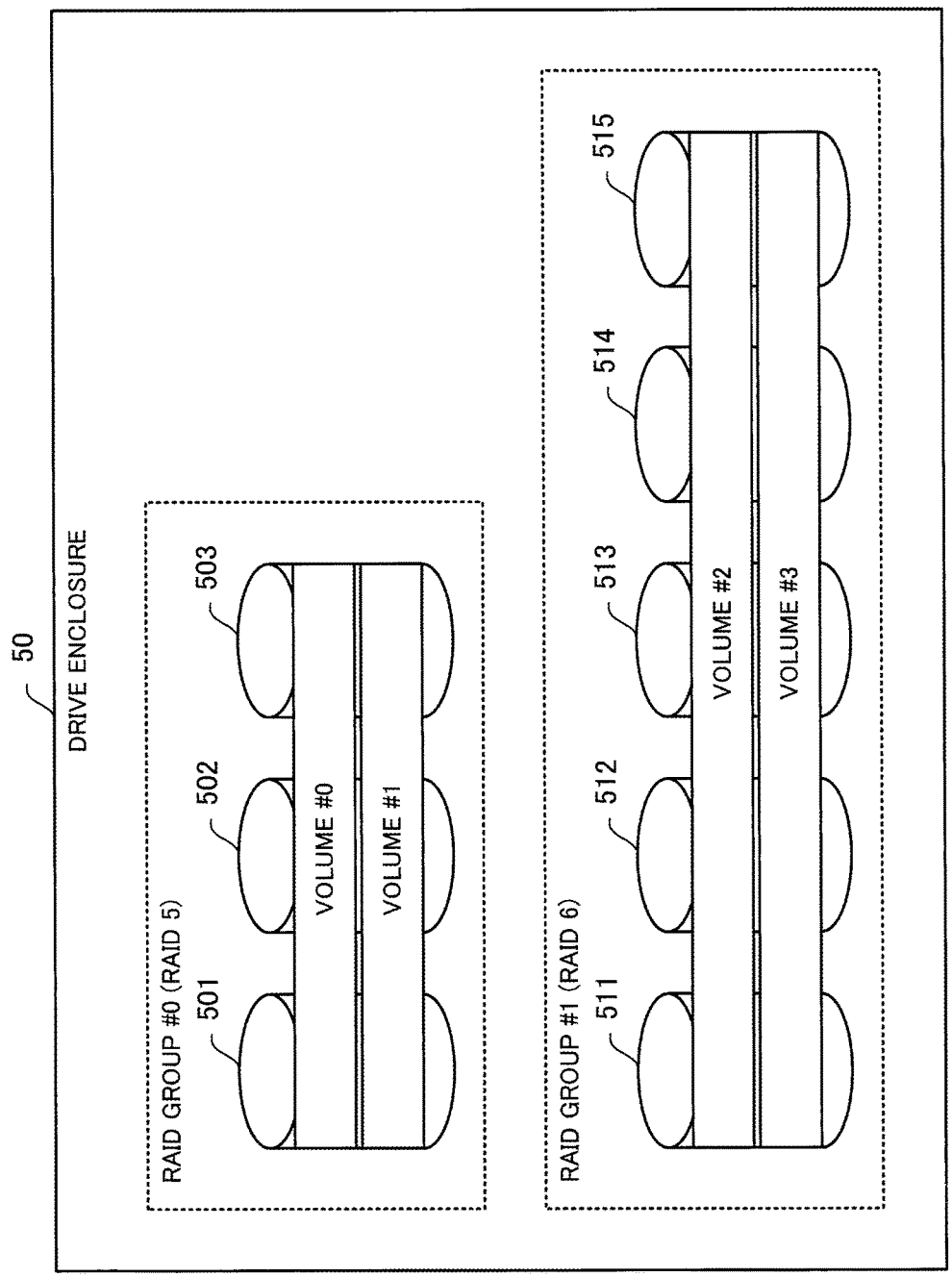
FIG. 4 illustrates an example of RAID groups and volumes allocated from the RAID groups in the second embodiment.

The following describes RAID groups made up of HDDs housed in the drive enclosure 50 and volumes allocated from the RAID groups, with reference to FIG. 4. FIG. 4 illustrates an example of RAID groups and volumes allocated from the RAID groups in the second embodiment.

The drive enclosure 50 houses HDDs 501 to 503 and HDDs 511 to 515. The HDDs 501 to 503 form a RAID 5 group #0. The RAID group #0 includes volumes #0 and #1 each having predetermined storage capacity allocated thereto. The HDDs 511 to 515 form a RAID 6 group #1. The RAID group #1 includes volumes #2 and #3 each having predetermined storage capacity allocated thereto. The volumes #0 to #3 are logical volumes that are recognizable by the host 6.

In this connection, the RAID group #0 is configured as RAID 5, and this RAID level is a stripe set with distributed parity. In addition, the RAID group #1 is configured as RAID 6, and this RAID level is a stripe set with dual distributed parity.

Figure 5:
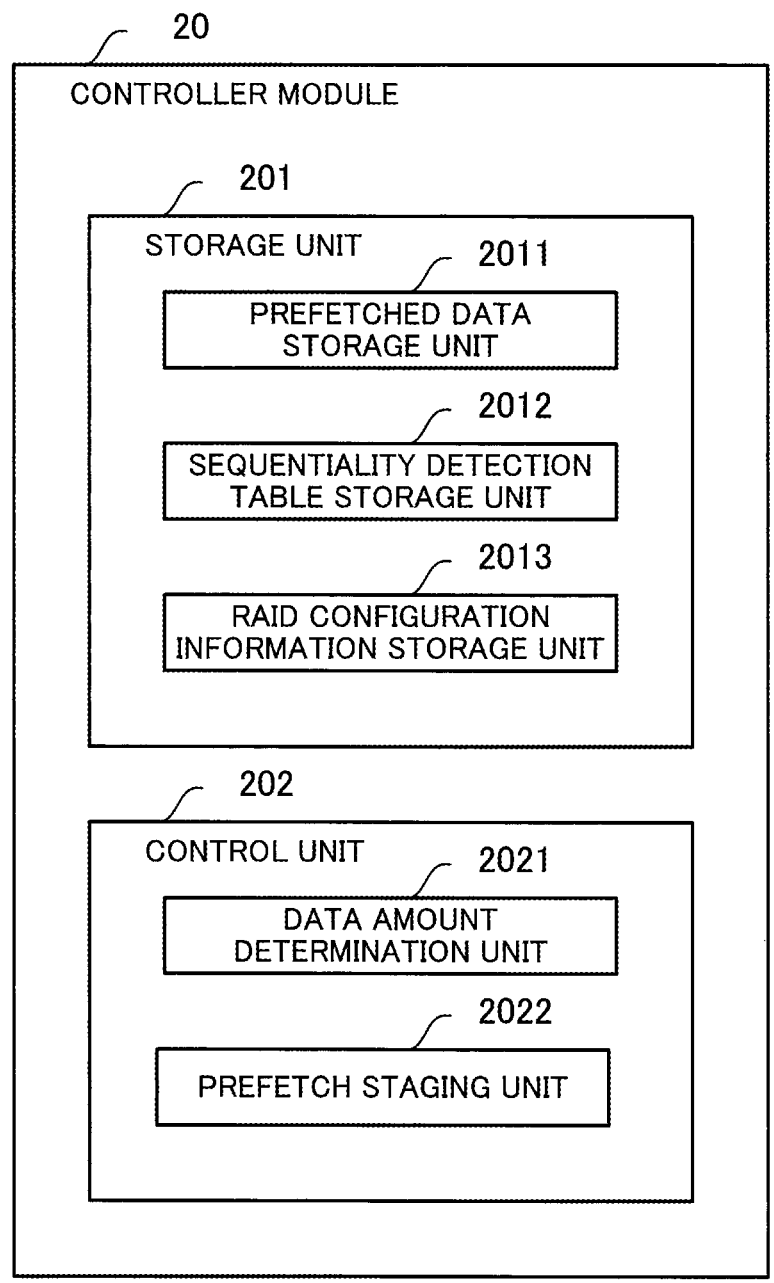
FIG. 5 is a block diagram illustrating an exemplary configuration of processing functions of a controller module according to the second embodiment.

The following describes the configuration of the processing functions of a controller module with reference to FIG. 5. FIG. 5 is a block diagram illustrating an exemplary configuration of processing functions of a controller module according to the second embodiment.

The controller module 20 functions as a storage unit 201 and a control unit 202. The controller module 20 is an example of a storage control apparatus. The storage unit 201 is implemented by using the memory 22. The control unit 202 is implemented by the processor of the controller module 20 running a prescribed program, for example.

The storage unit 201 functions as a prefetched data storage unit 2011, a sequentiality detection table storage unit 2012, and a RAID configuration information storage unit 2013. The prefetched data storage unit 2011 stores data prefetched from storage devices. The prefetched data storage unit 2011 is implemented by using a cache memory of the memory 22. The sequentiality detection table storage unit 2012 stores a sequentiality detection table. This sequentiality detection table will be described later with reference to FIG. 7. The RAID configuration information storage unit 2013 stores RAID configuration information. The RAID configuration information includes information for identifying the RAID level of each RAID group, a group of storage devices forming each RAID group, and volumes to which storage areas are allocated from each RAID group.

The control unit 202 includes a data amount determination unit 2021 and a prefetch staging unit 2022. The data amount determination unit 2021 determines how much data to prefetch (a prefetch staging data amount). The data amount determination unit 2021 is implemented by the processor 21 performing a data amount determination process, which will be described later. The prefetch staging unit 2022 prefetches data whose amount (that is, a prefetch staging data amount) is determined by the data amount determination unit 2021. The prefetch staging unit 2022 is implemented by the processor 21 performing a prefetch staging process, which will be described later.

Figure 6:
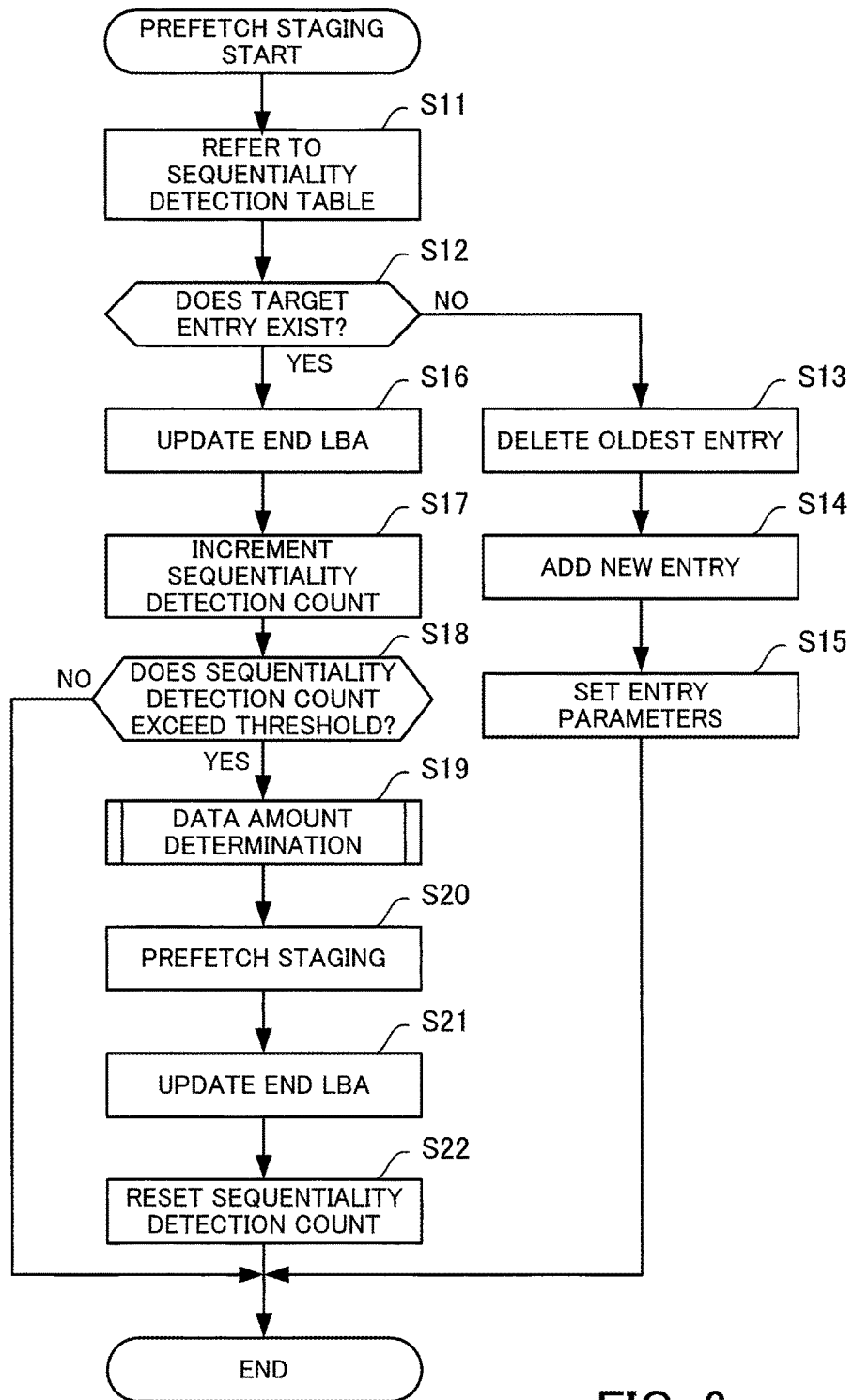
FIG. 6 is a flowchart illustrating a prefetch staging process according to the second embodiment.

The following describes the prefetch staging process of the second embodiment with reference to FIG. 6. FIG. 6 is a flowchart illustrating a prefetch staging process according to the second embodiment.

The prefetch staging process is to determine whether an execution condition for prefetch staging is satisfied, and then to perform the prefetch staging when the execution condition is satisfied. The prefetch staging process is initiated by the control unit 202 upon reception of a read request from the host 6.

(Step S11) The prefetch staging unit 2022 (control unit 202) refers to the seqentiality detection table. The sequentuality here means the continuity of read data requested by a read request.

Now, the sequentiality detection table will be described with reference to FIG. 7. FIG. 7 illustrates an example of a sequentiality detection table according to the second embodiment.

The sequentiality detection table 300 has a predetermined number of entries, which correspond to respective volumes (hereinafter, referred to as target volumes) that is to be subjected to sequentiality detection. The sequentiality detection table 300 includes the following fields: "Volume Number (No.)", "Start Logical Block Address (LBA)", "End LBA", "Sequentiality Detection Count", and "Timestamp". The "Volume Number" field contains the identification information of a target volume, which is used to identify an entry corresponding to the target volume. The entry corresponding to a target volume includes parameters (entry parameters) in the "Start LBA", "End LBA", "Sequentiality Detection Count", and "Timestamp" fields.

The "Start LBA" field indicates the start LBA of a target volume at which sequentiality detection starts. This start LBA is specified by a read request that triggered the start of the sequentiality detection. The "End LBA" field indicates the end LBA of a target volume in which sequentiality detection is being performed. This end LBA is specified by a last read request that is received last in the process of the sequentiality detection or is obtained from a result of performing prefetch staging. The "Sequentiality Detection Count" field indicates how many times sequentiality was detected with respect to a target volume through the sequentiality detection. The "Timestamp" field indicates the last update time of the entry with respect to a target volume.

For example, the sequentiality detection table 300 indicates that a target volume identified by a volume number "#V1" has a start LBA of "#H1", an end LBA of "#T1", a sequentiality detection count of "#S1", and a timestamp of "#TS1".

Now refer back to FIG. 6 to continue the explanation of the prefetch staging process.

(Step S12) The prefetch staging unit 2022 determines whether the sequentiality detection table contains an entry (target entry) that indicates a volume specified for data read by the received read request, as a target volume. The prefetch staging unit 2022 moves to step S16 if the sequentiality detection table contains such a target entry; otherwise, the prefetch staging unit 2022 moves to step S13.

(Step S13) The prefetch staging unit 2022 deletes the oldest entry with reference to the "Timestamp" field if the number of entries in the sequentiality detection table reaches an upper limit. In this connection, if the number of entries in the sequentiality detection table does not reach the upper limit, the prefetch staging unit 2022 does not need to delete the oldest entry.

(Step S14) The prefetch staging unit 2022 adds a new entry that indicates the volume specified for data read by the received read request, as a target volume.

(Step S15) The prefetch staging unit 2022 sets entry parameters for the target volume in the new entry. After this setting is complete, the prefetch staging unit 2022 completes this prefetch staging process.

(Step S16) The prefetch staging unit 2022 updates the "End LBA" field of the target entry with the end LBA specified by the received read request.

(Step S17) The prefetch staging unit 2022 increments the sequentiality detection count by one in the "Sequentiality Detection Count" field of the target entry.

(Step S18) The prefetch staging unit 2022 determines whether the sequentiality detection count exceeds a preset threshold. If the sequentiality detection count exceeds the preset threshold, the prefetch staging unit 2022 detects sequentiality and then moves to step S19. If the sequentiality detection count does not exceed the preset threshold, the prefetch staging unit 2022 completes the prefetch staging process.

(Step S19) The data amount determination unit 2021 (control unit 202) performs a data amount determination process. This data amount determination process is to determine a prefetch staging data amount. This data amount determination process will be described later with reference to FIG. 8.

(Step S20) The prefetch staging unit 2022 performs prefetch staging on the basis of the prefetch staging data amount determined at step S19.

(Step S21) The prefetch staging unit 2022 updates the "End LBA" field of the target entry with the end LBA obtained as a result of performing the prefetch staging.

(Step S22) The prefetch staging unit 2022 resets the sequentiality detection count in the "Sequentiality Detection Count" field of the target entry to an initial value (for example, resets to zero). After this resetting, the prefetch staging unit 2022 completes the prefetch staging process.

Figure 8:
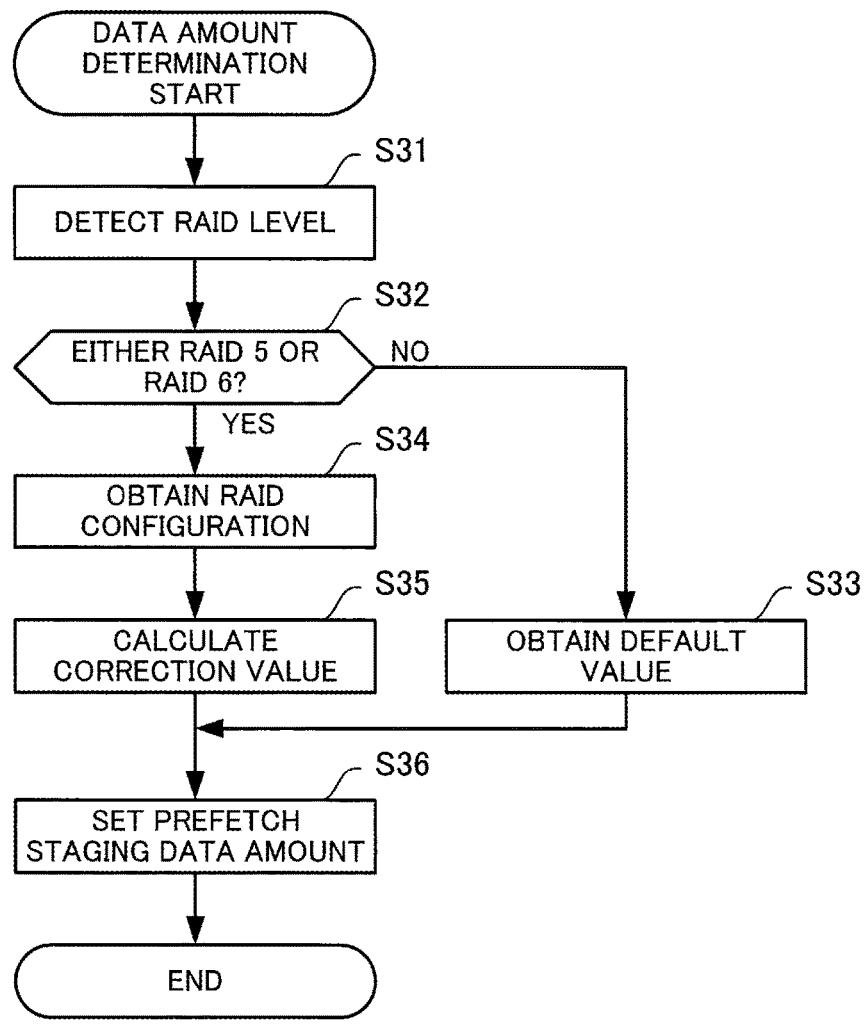
FIG. 8 is a flowchart illustrating a data amount determination process according to the second embodiment.

The following describes how to determine a data amount in the second embodiment. FIG. 8 is a flowchart illustrating a data amount determination process according to the second embodiment.

The data amount determination process is to determine a prefetch staging data amount. This data amount determination process is performed by the data amount determination unit 2021 at step S19 of the prefetch staging process.

(Step S31) The data amount determination unit 2021 detects the RAID level of a target volume. With reference to the RAID configuration information, the data amount determination unit 2021 is able to identify a RAID group whose storage areas are allocated to the target volume, and to detect the RAID level of the RAID group.

(Step S32) The data amount determination unit 2021 determines whether the RAID level of the target volume is either RAID 5 or RAID 6. If the RAID level of the target volume is neither RAID 5 nor RAID 6, the data amount determination unit 2021 moves to step S33. If the RAID level of the target volume is either RAID 5 or RAID 6, the data amount determination unit 2021 moves to step S34.

(Step S33) The data amount determination unit 2021 obtains a default value (corresponding to the first data amount in the first embodiment) as the prefetch staging data amount. The default value is preset with taking into consideration a variety of performance of storage devices and others.

(Step S34) The data amount determination unit 2021 obtains the RAID configuration of the target volume. Thereby, the data amount determination unit 2021 is able to obtain the number of storage devices (the number of disks) forming the RAID group of the target volume.

(Step S35) The data amount determination unit 2021 calculates a correction value (corresponding to the second data amount in the first embodiment) as the prefetch staging data amount. This correction value is to balance the numbers of read commands issued to storage devices. For example, the data amount determination unit 2021 is able to calculate such a correction value V with the following equation (1).

$$V = (d \times n + 1) \times (d - p) \times c \quad (1),$$

where d denotes the number of disks forming a RAID group, n is an arbitrary natural number, p denotes the number of parity disks, and c denotes a cache page size. The number of parity disks p is "1" in the case of RAID 5, and is "2" in the case of RAID 6. In addition, it is assumed that the arbitrary natural number n is a minimum value that produces a correction value V exceeding the default value. The constant "1" in the above equation (1) is a shift amount for sequentially changing a storage device to which more commands are issued.

For example, in the case of d="5", p="2", c="64 kB (bytes)", and a default value of 1024 (=16c) kB", a correction value V (n=1) is calculated to be "1152 kB". In addition, a correction value V (n=2) is calculated to be "2112 kB". Both of the correction values V (n=1) and V (n=2) exceed the default value of "1024 kB". Therefore, in this case, the data amount determination unit 2021 adopts the correction value V of "1152 kB".

(Step S36) The data amount determination unit 2021 sets the prefetch staging data amount to the default value obtained at step S33 or to the correction value calculated at step S35, and then completes the data amount determination process.

In this connection, the determination of the RAID level performed by the data amount determination unit 2021 at step S32 corresponds to detection of the state (detection target state) where an imbalance in the numbers of commands issued to storage devices is caused due to prefetch staging using the default value as the prefetch staging data amount. That is to say, the data amount determination unit 2021 does not always need to detect the detection target state on the basis of a default value. The data amount determination unit 2021 is able to detect the detection target state under a preset detection condition.

For example, the data amount determination unit 2021 is able to define the number of data disks (the number of storage devices corresponding to data blocks) in a group of storage devices forming a RAID group, instead of whether a RAID level is RAID 5 or RAID 6, as the detection condition for detecting the detection target state. Alternatively, the data amount determination unit 2021 is able to define the number of parity disks (the number of storage devices corresponding to parity blocks) in a group of storage devices forming a RAID group, instead of whether a RAID level is RAID 5 or RAID 6, as the detection condition for detecting the detection target state. Specifically, the data amount determination unit 2021 is able to set a condition that "2" parity disks exist in a group of storage devices forming a RAID group, as the detection condition for detecting the detection target state. What the number of parity disks is "2" corresponds to a RAID level 6.

In addition, the data amount determination unit 2021 determines a prefetch staging data amount for each execution of the prefetch staging process. However, instead of this, the data amount determination unit 2021 may be designed to determine the prefetch staging data amount once when a volume is configured. In this case, the prefetch staging unit 2022 may be designed to obtain the prefetch staging data amount determined when the volume is configured, and then to perform prefetch staging.

Now, the situation where a correction value balances the numbers of read commands issued to storage devices will be described with reference to FIGS. 9 to 13.

Figure 9:
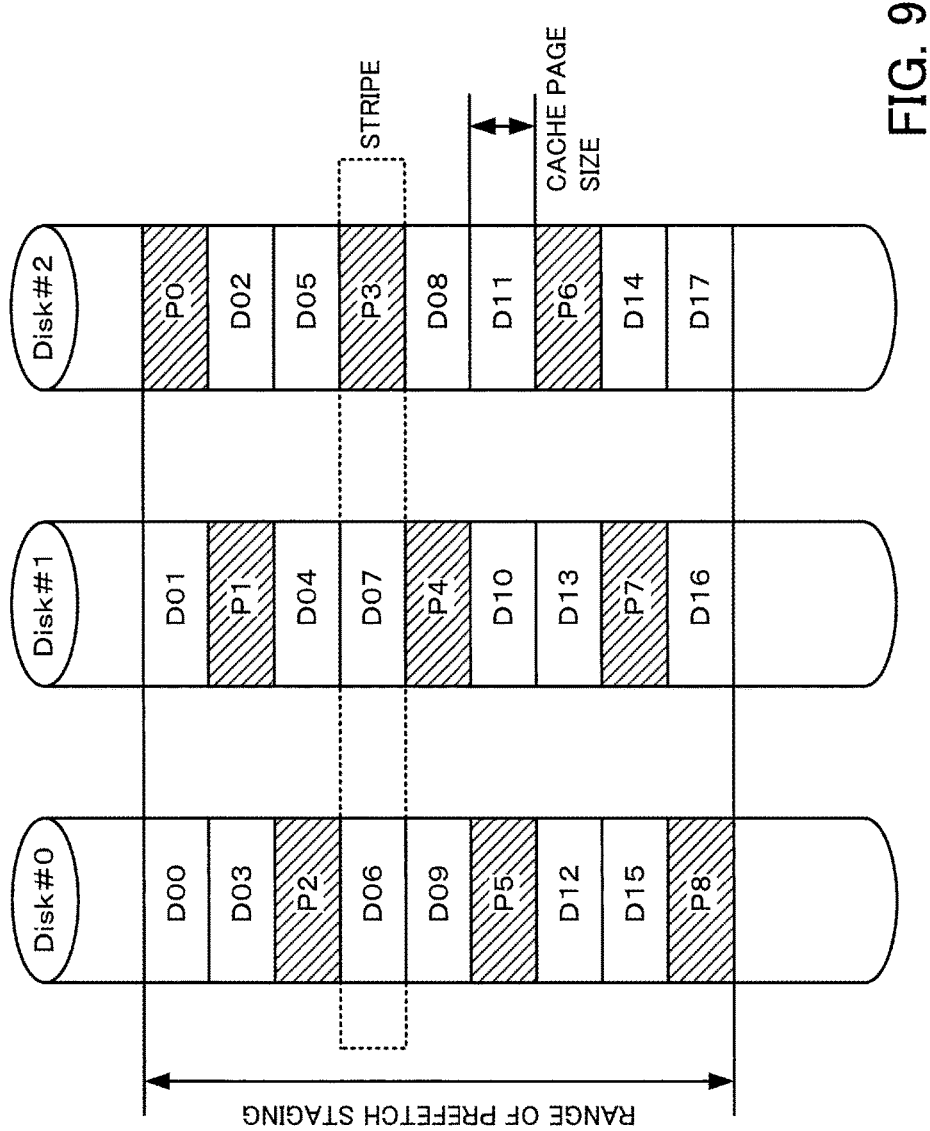
FIG. 9 illustrates a reference example of reading data from a RAID 5 disk set with a default value as a prefetch staging data amount.

The following describes how to read data from a RAID 5 disk set with a default value as a prefetch staging data amount, with reference to FIG. 9. FIG. 9 illustrates a reference example of reading data from a RAID 5 disk set with a default value as a prefetch staging data amount.

A RAID group illustrated is configured as RAID level 5, and is made up of three disks, Disk #0 to Disk #2. These disks, Disk #0 to Disk #2, include two data disks and one parity disk for one stripe. Each data block (represented as "D+number", for example, "D00") is indicated by a rectangular frame without hutching, and each parity block (represented as "P+number", for example, "P0") is indicated by a rectangular frame with hutching. Each of the data blocks and parity blocks has a cache page size (for example, 64 kB). The illustrated range of prefetch staging indicates that a prefetch staging data amount is equal to a size of 18 cache pages.

To stage data in the range of prefetch staging into a cache memory, the prefetch staging unit 2022 issues read commands to each disk. The prefetch staging unit 2022 reads data blocks but does not read parity blocks. In general, skipping over parity blocks leads to higher throughput in reading data from a disk.

That is, the prefetch staging unit 2022 reads continuous data blocks from a single disk in response to a single read command. Therefore, to perform the prefetch staging, the prefetch staging unit 2022 issues a read command three times to Disk #0, a read command four times to Disk #1, and a read command three times to Disk #2. The three read commands for Disk #0 are issued to read data blocks "D00 and D03", data blocks "D06 and D09", and data blocks "D12 and D15". The four read commands for Disk #1 are issued to read a data block "D01", data blocks "D04 and D07", data blocks "D10 and D13", and a data block "D16".

For such a range of prefetch staging, the same number of read commands as in the above execution of the prefetch staging are issued to each disk in the next execution of the prefetch staging. That is, a difference between the number of read commands issued to each of Disk #0 and Disk #2 and the number of read commands issued to Disk #1 increases, and thus the load of reading data from Disk #1 becomes higher than the load of reading data from each of the Disk #0 and Disk #2.

Figure 10:
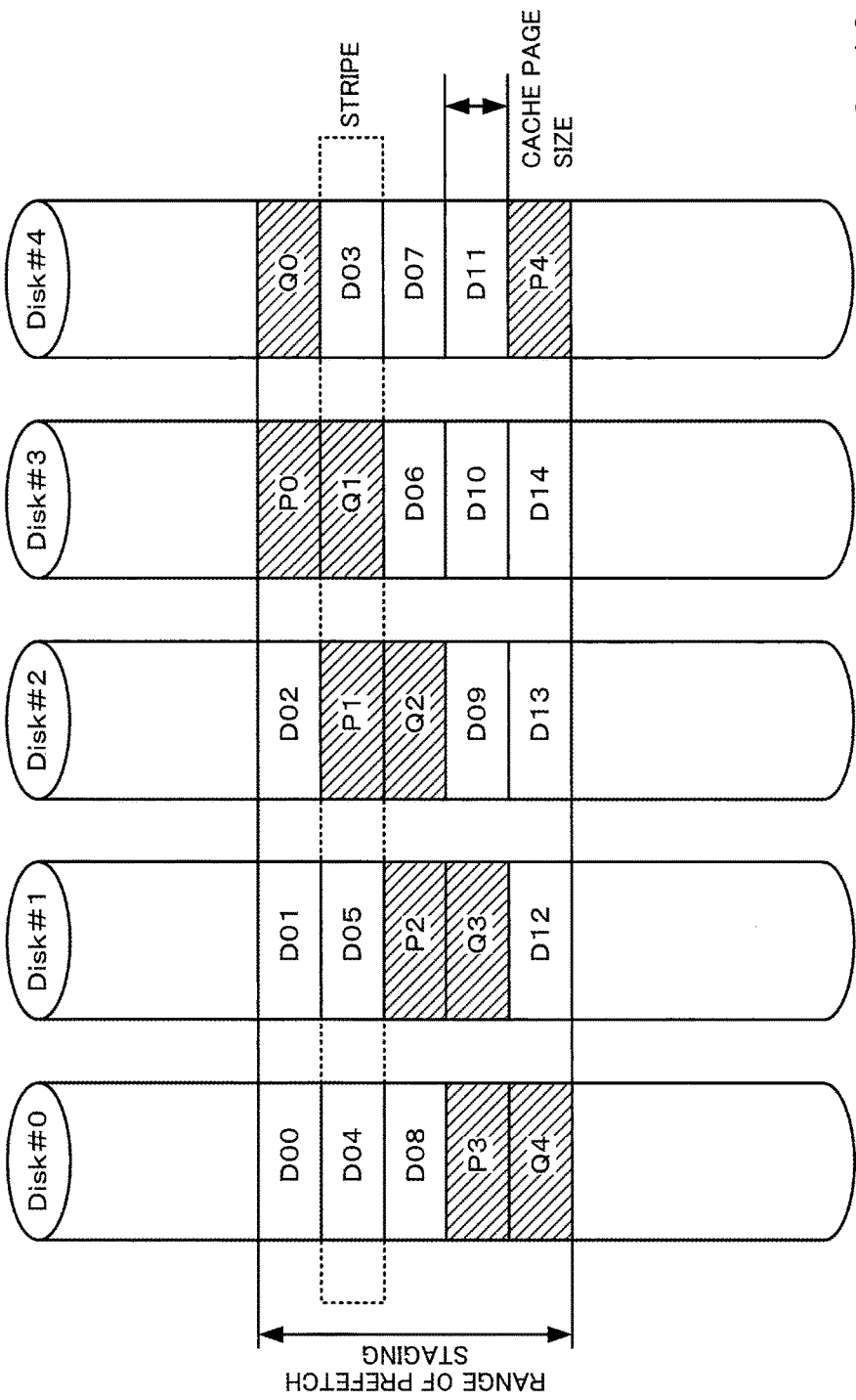
FIG. 10 illustrates a reference example of reading data from a RAID 6 disk set with a default value as a prefetch staging data amount.

The following describes how to read data from a RAID 6 disk set with a default value as a prefetch staging data amount, with reference to FIG. 10. FIG. 10 illustrates a reference example of reading data from a RAID 6 disk set with a default value as a prefetch staging data amount.

A RAID group illustrated is configured as RAID level 6, and is made up of five disks, Disk #0 to Disk #4. These disks, Disk #0 to Disk #4, include three data disks and two parity disks for one stripe. Each data block (represented as "D+number", for example, "D00") is indicated by a rectangular frame without hutching, and each parity block (represented as "P+number" (for example, "P0") or as "Q+number" (for example, "Q0")) is indicated by a rectangular frame with hutching. Each of the data blocks and parity blocks has a cache page size (for example, 64 kB). The illustrated range of prefetch staging indicates that the prefetch staging data amount is equal to a size of 15 cache pages.

To stage data in the range of prefetch staging into a cache memory, the prefetch staging unit 2022 issues read commands to each disk. To perform the prefetch staging, the prefetch staging unit 2022 issues a read command once to Disk #0, twice to Disk #1, twice to Disk #2, once to Disk #3, and once to Disk #4. The one read command for Disk #0 is issued to read data blocks "D00, D04, and D08". The two read commands for Disk #1 are issued to read data blocks "D01 and D05" and a data block "D12".

For such a range of prefetch staging, the same number of read commands as in the above execution of the prefetch staging are issued to each disk in the next execution of the prefetch staging. That is, a difference between the number of read commands issued to each of Disk #0, Disk #3, and Disk #4 and the number of read commands issued to each of Disk #1 and Disk #2 increases, and thus the load of reading data from each of Disk #1 and Disk #2 becomes higher than the load of reading data from each of Disk #0, Disk #3, and Disk #4.

Figure 11:
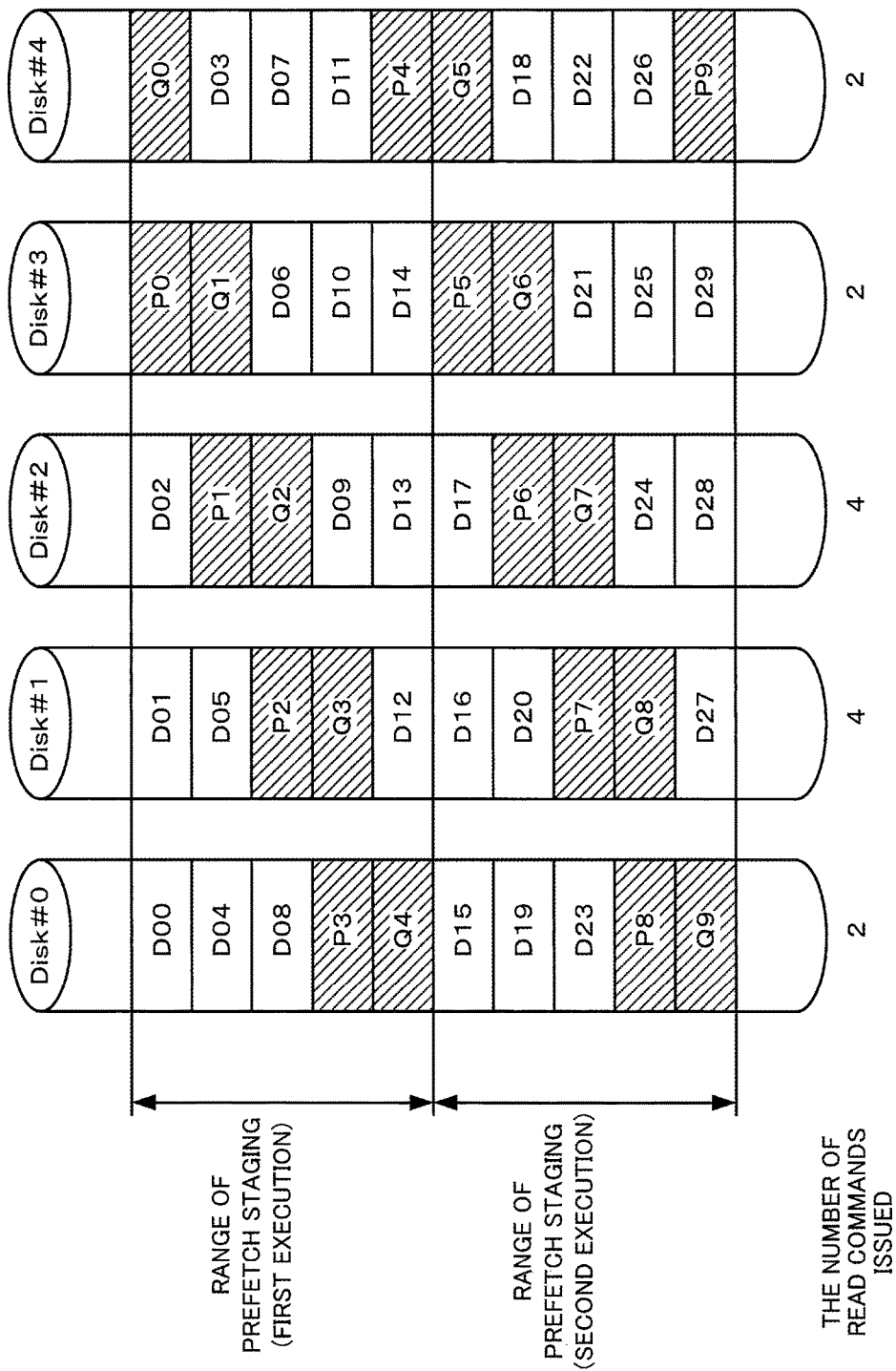
FIG. 11 illustrates a reference example of prefetch staging in which a difference in the number of read commands issued increases.

The following describes how a difference in the number of read commands issued increases by repeating prefetch staging, with reference to FIG. 11. FIG. 11 illustrates a reference example of prefetch staging in which a difference in the number of read commands issued increases.

A RAID group illustrated is configured as RAID level 6. This RAID level is illustrated in FIG. 10. In the first execution of prefetch staging, a read command is issued once, twice, twice, once, and once to Disk #0 to Disk #4, respectively. In the second execution of the prefetch staging, the same number of read commands as in the first execution of the prefetch staging are issued to each of Disk #0 to Disk #4. Therefore, by performing the prefetch staging twice, two commands are issued to each of Disk #0, Disk #3, and Disk #4, and four commands are issued to each of Disk #1 and Disk #2. Due to such a difference in the number of read commands issued, a higher load is imposed on specific disks, and a load difference increases as the prefetch staging is repeated.

In the case where such an imbalance of the number of commands issued occurs, the data amount determination unit 2021 changes the prefetch staging data amount from the default value to a correction value.

Figure 12:
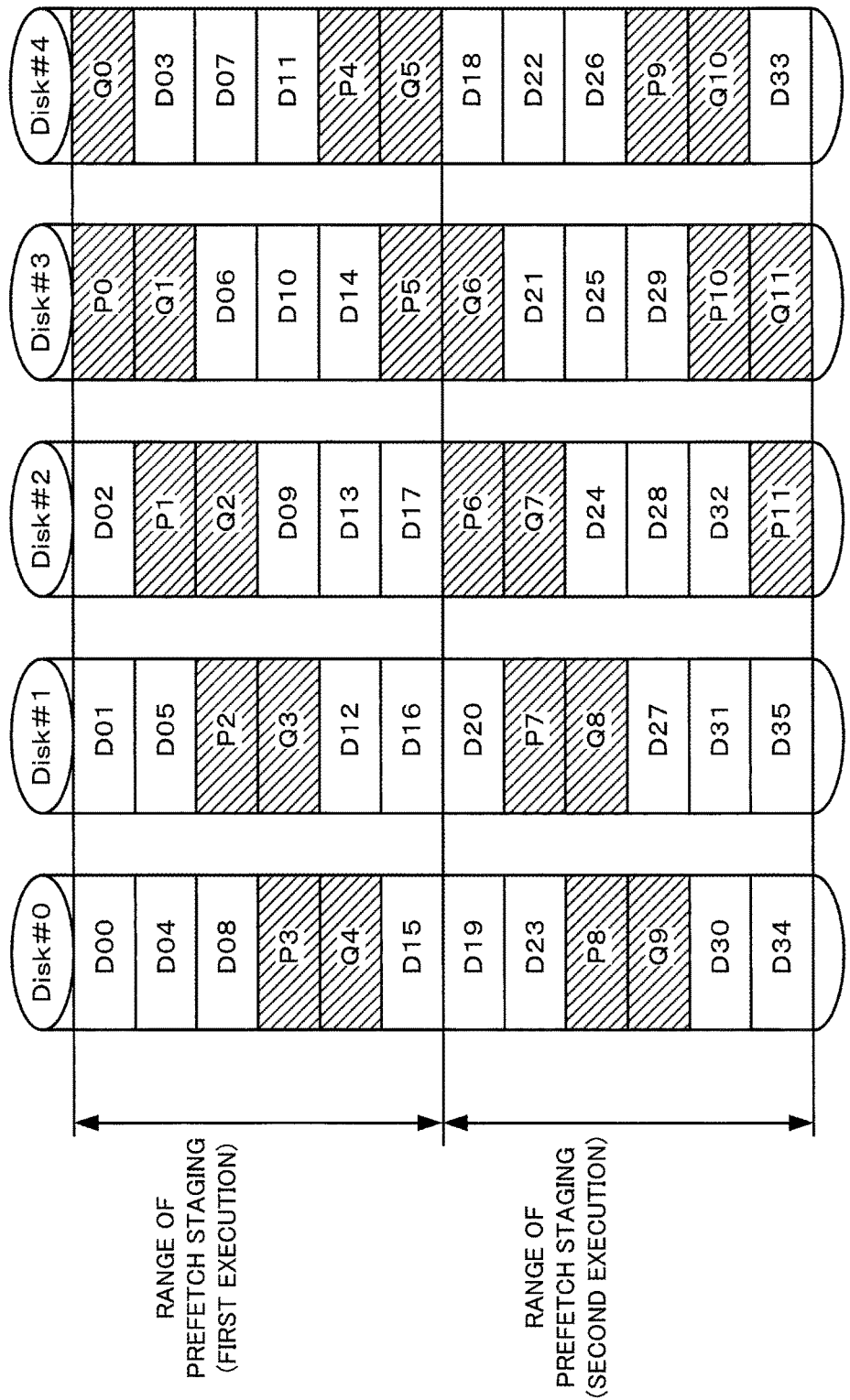
FIG. 12 illustrates an example of the number of read commands issued, according to the second embodiment.

The following describes how many times a read command is issued when a prefetch staging data amount is changed from the default value to a correction value, with reference to FIG. 12. FIG. 12 illustrates an example of the number of read commands issued, according to the second embodiment.

A RAID group illustrated is configured as RAID level 6. This RAID level is illustrated in FIG. 10. What is different from FIG. 10 is a size for a range of prefetch staging. FIG. 10 describes the case where a range of prefetch staging is equal to a size of 15 cache pages, whereas FIG. 12 describes the case where a range of prefetch staging is equal to a size of 18 cache pages. That is, the prefetch staging data amount determined by the correction value is a size of 18 cache pages.

Thereby, the prefetch staging unit 2022 issues a read command twice, twice, twice, once, and once to Disk #0 to Disk #4, respectively, in the first execution of prefetch staging. Then, the prefetch staging unit 2022 issues a read command twice, twice, once, once, and twice to Disk #0 to Disk #4, respectively, in the second execution of the prefetch staging.

This prevents a fixed number of read commands from being issued to each of Disk #0 to Disk #4 when the prefetch staging is performed plural times.

Figure 13:
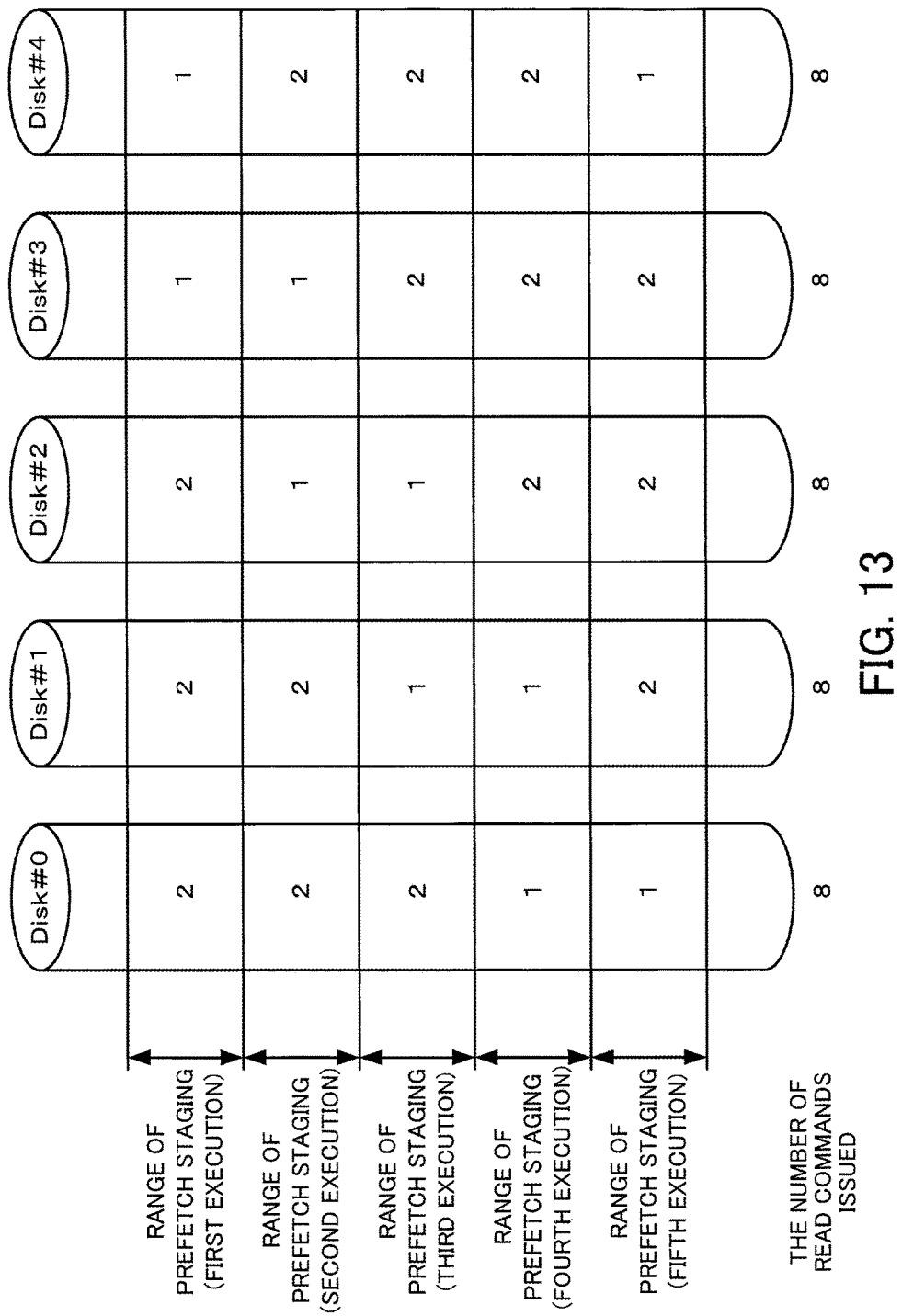
FIG. 13 illustrates an example of equalizing the number of read commands issued, according to the second embodiment.

The following describes how many times a read command is issued to Disk #0 to Disk #4 when prefetch staging is performed five times, with reference to FIG. 13. FIG. 13 illustrates an example of equalizing the number of read commands issued, according to the second embodiment.

The same numbers of read commands as described with reference to FIG. 12 are issued to Disk #0 to Disk #4 in the first and second executions of the prefetch staging. In the third execution of the prefetch staging, a read command is issued twice, once, once, twice, and twice to Disk #0 to Disk #4, respectively. In the fourth execution of the prefetch staging, a read command is issued once, once, twice, twice, and twice to Disk #0 to Disk #4, respectively. In the fifth execution of the prefetch staging, a read command is issued once, twice, twice, twice, and once to Disk #0 to Disk #4, respectively.

As a result, the prefetch staging unit 2022 is able to equalize the total number of read commands issued to each of Disk #0 to Disk #4 to be eight, by performing the prefetch staging five times. As described above, the storage apparatus 10 is able to correct an imbalance in the numbers of read commands issued to Disk #0 to Disk #4, which is caused by one-time prefetch staging, by performing the prefetch staging five times per cycle (imbalance correction cycle).

Such an imbalance correction cycle is accomplished by changing the default value that causes a fixed imbalance of the number of read commands issued by one-time prefetch staging, to a correction value.

This approach enables the storage apparatus 10 to minimize degradation in the performance of prefetch staging due to a reduction in the responsiveness of a specific disk among Disk #0 to Disk #4. As a result, the storage apparatus 10 is able to improve throughput for sequential read.

(Variation)

In the second embodiment, a correction value V is calculated with the equation (1) at step S35 of the data amount determination process. However, a different equation may be used to calculate such a correction value V.

For example, the data amount determination unit 2021 calculates a correction value V with the following equation (2).

$$V=(d\times n+k)\times(d-p)\times c \quad (2),$$

where d denotes the number of disks forming a RAID group, n is an arbitrary natural number, k is a natural value that is coprime to d, p denotes the number of parity disks, and c denotes a cache page size. In this connection, the number of parity disks p is "1" in the case of RAID 5, and is "2" in the case of RAID 6. In addition, the arbitrary natural value n is a minimum value that produces a correction value V exceeding a default value. In this connection, the constant "k" in the equation (2) is a shift amount for sequentially changing a storage device to which more commands are issued.

For example, in the case of d="5", k may be "2", "3" or another value. Therefore, assuming that d="5", k="2", p="2", c="64 kB (bytes)", and a default value is "1024 (=16c) kB", a correction value V (n=1) is calculated to be "1344 kB". In addition, a correction value V (n=2) is calculated to be "2304 kB". Both of the correction values V (n=1) and V (n=2) exceed the default value of "1024 kB". Therefore, in this case, the data amount determination unit 2021 adopts the correction value V of "1344 kB".

As described above, the data amount determination unit 2021 is able to easily calculate a correction value V that is able to correct an imbalance of the number of read commands issued, which is caused by one-time prefetch staging.

The above-described processing functions may be implemented by using a computer. In this case, a program describing the processing content of the functions of the storage control apparatus 1, the storage apparatus 10, or the controller modules 20 and 30 is provided and executed on a computer, so that the processing functions are implemented on the computer. The program describing the processing content is recorded on a computer-readable recording medium. Computer-readable recording media include magnetic storage devices, optical discs, magneto-optical recording media, semiconductor memories, and others. Magnetic storage devices include hard disk drives (HDD), flexible disks (FD), magnetic tapes, and others. Optical discs include Digital Versatile Discs (DVD), DVD-RAM, Compact Disc Read Only Memory (CD-ROM), CD-Recordable (CD-R), CD-ReWritable (CD-RW), and others. Magneto-optical recording media include Magneto-Optical disks (MO) and others.

To distribute the program, for example, portable recording media, such as DVD or CD-ROM, on which the program is recorded may be put on sale. Alternatively, the program may be stored in a storage device of a server computer and may be transferred from the server computer to another computer through a network.

A computer that executes the program may store the program recorded on a portable recording medium or the program received from the server computer to its local storage device, read the program from the local storage device, and then run the program. In this connection, the computer may run the program while reading the program directly from the portable recording medium. In addition, the computer may run the program while receiving the program from the server computer connected over a network.

Further, at least some of the above-described processing functions may be implemented by using a DSP, an ASIC, a PLD, or other electronic circuits.

According to one aspect, a storage control apparatus and a storage control method are able to improve throughput for sequential read.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus comprising:
   a memory; and
   a processor that performs a procedure including:
      detecting that a RAID level of a plurality of storage devices forming a RAID array is RAID 5 or RAID 6;
      determining a result of multiplying a value obtained by adding one to a number of storage devices by a data size of data blocks of a stripe in the plurality of storage devices, as an amount of data to be prefetched from the plurality of storage devices to the memory; and
      issuing a read command for each set of continuous data blocks, separated by parity blocks, to each of the plurality of storage devices, in order to prefetch the determined amount of data from the plurality of storage devices to the memory.

2. A storage control method comprising:
   detecting that a RAID level of a plurality of storage devices forming a RAID array is RAID 5 or RAID 6;
   determining, by a computer, a result of multiplying a value obtained by adding one to a number of storage devices by a data size of data blocks of a stripe in the plurality of storage devices, as an amount of data to be prefetched from the plurality of storage devices to the memory; and
   issuing, by the computer, a read command for each set of continuous data blocks, separated by parity blocks, to each of the plurality of storage devices, in order to prefetch the determined amount of data from the plurality of storage devices to the memory.

3. A non-transitory computer-readable storage medium storing a storage control program that causes a computer to perform a procedure comprising:
   detecting that a RAID level of a plurality of storage devices forming a RAID array is RAID 5 or RAID 6;
   determining a result of multiplying a value obtained by adding one to a number of storage devices by a data size of data blocks of a stripe in the plurality of storage devices, as an amount of data to be prefetched from the plurality of storage devices to the memory; and
   issuing a read command for each set of continuous data blocks, separated by parity blocks, to each of the plurality of storage devices, in order to prefetch the determined amount of data from the plurality of storage devices to the memory.

* * * * *